US009076418B2

(12) United States Patent
Lengeling et al.

(10) Patent No.: US 9,076,418 B2
(45) Date of Patent: Jul. 7, 2015

(54) GRAPHICAL USER INTERFACE FOR MUSIC SEQUENCE PROGRAMMING

(71) Applicant: Apple Inc., Cupertino, CA (US)

(72) Inventors: Gerhard Lengeling, Los Altos Hills, CA (US); Jan-Hinnerk Helms, Hamburg (DE)

(73) Assignee: Apple Inc., Cupertino, CA (US)

( * ) Notice: Subject to any disclaimer, the term of this patent is extended or adjusted under 35 U.S.C. 154(b) by 229 days.

(21) Appl. No.: 13/722,464

(22) Filed: Dec. 20, 2012

(65) Prior Publication Data

US 2013/0112067 A1 May 9, 2013

Related U.S. Application Data

(63) Continuation of application No. PCT/US2011/051177, filed on Sep. 12, 2011, which is a continuation of application No. 12/881,061, filed on Sep. 13, 2010, now Pat. No. 8,330,033.

(51) Int. Cl.
*G09B 15/00* (2006.01)
*G09B 15/02* (2006.01)
(Continued)

(52) U.S. Cl.
CPC ............... *G10H 1/0008* (2013.01); *G10H 1/42* (2013.01); *G10H 2210/341* (2013.01); *G10H 1/0025* (2013.01); *G10H 1/0066* (2013.01); *G10H 1/46* (2013.01); *G10H 2210/005* (2013.01); *G10H 2210/105* (2013.01); *G10H 2210/361* (2013.01); *G10H 2220/005* (2013.01); *G10H 2220/096* (2013.01); *G10H 2220/111* (2013.01);
(Continued)

(58) Field of Classification Search
CPC .............. G10H 1/0066; G10H 1/0008; G10H 2240/056; G10H 2230/015; G10H 2220/111; G10H 2220/135; G10H 1/368; G10H 2220/106; G10H 1/40; G10H 2210/341; G10H 2210/361; G10H 2220/126; G10H 2220/295; G10H 2240/141; G10H 2240/311; G10H 2210/071
See application file for complete search history.

(56) References Cited

U.S. PATENT DOCUMENTS 5,557,057 A 9/1996 Starr
5,741,990 A 4/1998 Davies
(Continued)

OTHER PUBLICATIONS

Apple iTunes App Store, "moxMatrix," mode of expression, LLC, released May 13, 2010 (Available online at http:// itunes.apple.com/us/app/moxmatrixlid369087304 ?mt=8, downloaded Jul. 19, 2010).
(Continued)

*Primary Examiner* — Marlon Fletcher
(74) *Attorney, Agent, or Firm* — Fish & Richardson P.C.

(57) ABSTRACT

An example graphical programming interface system includes a processor. A grid matrix defined by a plurality of coordinate axes, having selectable matrix positions is displayed on a display device. Multiple movable object icons, each representing an object having a predefined output sound are also displayed on the display device. In one aspect, a single object data file is associated with each matrix position on said grid matrix. In this aspect, once a user places an object icon on a matrix position, the processor causes the predefined output sound associated with the object icon in accordance with the object data file associated with the matrix position at which the object icon is placed, and outputs the processed sound to an output device. This allows a user to program musical sequences by placing one or more object icons each on the selectable matrix positions.

34 Claims, 7 Drawing Sheets

(51) Int. Cl.
*G10H 1/00* (2006.01)
*G10H 1/42* (2006.01)
*G10H 1/46* (2006.01)

(52) U.S. Cl.
CPC .... *G10H2220/395* (2013.01); *G10H 2230/015* (2013.01); *G10H 2230/281* (2013.01); *G10H 2240/056* (2013.01); *G10H 2240/145* (2013.01); *G10H 2250/435* (2013.01)

(56) References Cited

U.S. PATENT DOCUMENTS

| | | | | |
|---|---|---|---|---|
| 5,812,675 | A | 9/1998 | Taylor | |
| 6,740,802 | B1 * | 5/2004 | Browne, Jr. | 84/609 |
| 7,010,760 | B2 | 3/2006 | Arnstein et al. | |
| 7,536,257 | B2 * | 5/2009 | Nishibori et al. | 701/419 |
| 7,538,267 | B2 | 5/2009 | Puryear | |
| 7,663,049 | B2 * | 2/2010 | Puryear | 84/609 |
| 8,063,296 | B2 | 11/2011 | Copeland et al. | |
| 8,173,884 | B2 * | 5/2012 | Gatzsche et al. | 84/615 |
| 8,822,803 | B2 * | 9/2014 | Terry | 84/644 |
| 2006/0016322 | A1 | 1/2006 | Randle et al. | |
| 2010/0064880 | A1 | 3/2010 | Takehisa et al. | |
| 2010/0064881 | A1 | 3/2010 | Takehisa | |
| 2010/0132536 | A1 | 6/2010 | O'Dwyer | |
| 2011/0063206 | A1 | 3/2011 | Karaoguz et al. | |
| 2011/0088535 | A1 | 4/2011 | Zarimis | |
| 2011/0100198 | A1 * | 5/2011 | Gatzsche et al. | 84/615 |
| 2011/0107192 | A1 | 5/2011 | Ge et al. | |
| 2012/0060668 | A1 * | 3/2012 | Lengeling et al. | 84/645 |
| 2013/0112067 | A1 * | 5/2013 | Lengeling et al. | 84/645 |
| 2014/0053710 | A1 * | 2/2014 | Serletic et al. | 84/609 |

OTHER PUBLICATIONS

Apple iTunes App Store, "Matrix Music Pad," Yudo Inc., Japan, updated Jul. 2, 2010 (Available online at http://itunes. apple.com/us/app/matrix-music-pad/id333221 071 ?mt=8, downloaded Jul. 19, 2010).

Apple iTunes App Store, "O-GAWA—The Future Beat Machine," Yudo Inc., Japan, updated Apr. 23, 2010 (Available online at http://itunes.apple.com/us/app/o-gawa-the-future-beat-machine/id363731655?mt=8, downloaded Jul. 19, 2010).

Apple iTunes App Store, "Sound Matrix II—ToneMatrix for iPhone," John Holdsworth, updated Dec. 3, 2009 (Available online at http://itunes.apple.com/us/app/soundmatrix-ii-tonematrixlid313032258?mt=8, downloaded Jul. 19, 2010).

PCT/US2011/051177 International Search Report and Written Opinion of the International Searching Authority; mailed on Mar. 29, 2012 (12 pages).

Beepstreetapps: "i Sequence tutorial: selections in pattern." May 14, 2010, XP55022374, Retrieved from the Internet :U RL:http://www.youtube.com/watch?v=HQqVFy8Td 1c&feature=related [retrieved on Mar. 20, 2012].

Joeyparanoia: "Ableton Launchpad Roland Clone Step Sequencer",Youtube.com, Jan. 5, 2010, XP55022269 ,Retrieved from the Internet:URL:http://www.youtube.com/watch?v=kH8QeZuXnZg&feature=related [retrieved on Mar. 19, 2012].

Gaudina et al., "Distributed Multimodal Interaction Driven Framework: Conceptual Model and Game Example", Haptic Audio-Visual Environments and Games (Have), 2010 Ieee International Symposium on, Ieee, Piscataway, NJ, USA, Oct. 16, 2010, XP031791845, ISBN: 978-1-4244-6507-1.

Cong Ning Et Al: "The Musicpatterns", Educational and Information Technology (Lceit), 2010 International Conference on, Ieee, Piscataway, NJ, USA, Sep. 17, 2010, pp. V3-9, XP031779929, ISBN: 978-1-4244-8033-3.

123synthland: "Boss Dr. Rhythm DR-1ID", youtube.com, Oct. 26, 2006, XP55022320, Internet Retrieved from the Internet: URL:http://www.youtube.com/watch?v=J1_RWnG43q4 [retrieved on Mar. 20, 2012].

International Preliminary Report on Patentability, International Application No. PCT/US2011/051177, 10 pages, Mar. 19, 2013.

* cited by examiner

GRAPHICAL USER INTERFACE FOR MUSIC SEQUENCE PROGRAMMING

CROSS REFERENCE TO RELATED APPLICATIONS

This is a continuation of International Application No. PCT/US2011/051177, filed Sep. 12, 2011, which claims priority to U.S. Ser. No. 12/881,061, filed Sep. 13, 2010, now U.S. Pat. No. 8,330,033, all hereby incorporated herein by reference in their entirety.

FIELD

The following relates to a graphical user interface for programming musical sequences.

BACKGROUND

If a Digital Audio Workstation (DAW) user desires to create a musical pattern such as a complex drum pattern they can utilize MIDI programming and/or arranging audio loops. However, utilizing MIDI programming and/or arranging audio loops requires in-depth expertise in MIDI and audio editing, as well as some musical background including knowledge of complex rhythms to achieve musically pleasing results where all elements of a sequence fit together.

Therefore users, particularly novice users, can benefit from a method and system for presenting a graphical user interface that allow a user to quickly program a musical sequence without music sequence programming expertise where all elements of the sequence fit together musically. Furthermore, experienced sequence programmers can benefit from a quick and efficient workflow for creating music sequences.

SUMMARY

Disclosed are systems, methods, and non-transitory computer-readable storage media for presenting a graphical user interface that allows a user to arrange icons within a grid to program musical sequences.

An example graphical programming interface system includes a processor. A grid matrix defined by a plurality of coordinate axes, having selectable matrix positions is displayed on a display device. Multiple movable object icons, each representing an object having a predefined output sound are also displayed on the display device. In one aspect, a single object data file is associated with each matrix position on the grid matrix. In this aspect, once a user places an object icon on a matrix position, the processor causes the predefined output sound associated with the object icon in accordance with the object data file associated with the matrix position at which the object icon is placed, and outputs the processed sound to an output device. This allows a user to program musical sequences by placing one or more object icons each on the selectable matrix positions.

In a further aspect, a plurality of object data files is associated with each matrix position. In this aspect, each of the plurality of object data files associated with each matrix position is associated with an icon. In this aspect, once a user places an object icon on a matrix position, the processor causes the predefined output sound associated with the object icon in accordance with the object data file associated with the matrix position and the object icon, and outputs the processed sound to an output device The plurality of object data files are organized or classified, such that different positions along a coordinate axis correspond to different characteristics of the object data files. The object data files are stored in a memory device.

In one aspect, the object data files are MIDI patterns or audio loop patterns. In another aspect, each object icon represents a component of a drum kit. In another aspect, a characteristic of the object data file is a rhythmic pattern of the object data file. In another aspect, the rhythmic pattern increases in complexity along a direction of a first coordinate axis of the grid matrix. In another aspect, a characteristic of the object data file for each object is intensity of notes in the object data file. In another aspect, the intensity of the object data file increases along a direction of a second coordinate axis of the grid matrix. In another aspect, the plurality of object data files are soundwave files.

Many other aspects and examples will become apparent from the following disclosure.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION

The method, system, and computer-readable medium for providing a graphical user interface for sequence programming can be implemented on a computer. The computer can be a data-processing system suitable for storing and/or executing program code. The computer can include at least one processor that is coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or 110 devices (including but not limited to keyboards, displays, pointing devices, etc.) can be coupled to the system either directly or through intervening I/O controllers. Network adapters may also be coupled to the system to enable the data processing system to become coupled to other data-processing systems or remote printers or storage devices through intervening private or public networks. Modems, cable modems, and Ethernet cards are just a few of the currently available types of network adapters. In one or more embodiments, the computer can be a desktop computer, laptop computer, or dedicated device.

Figure 1:
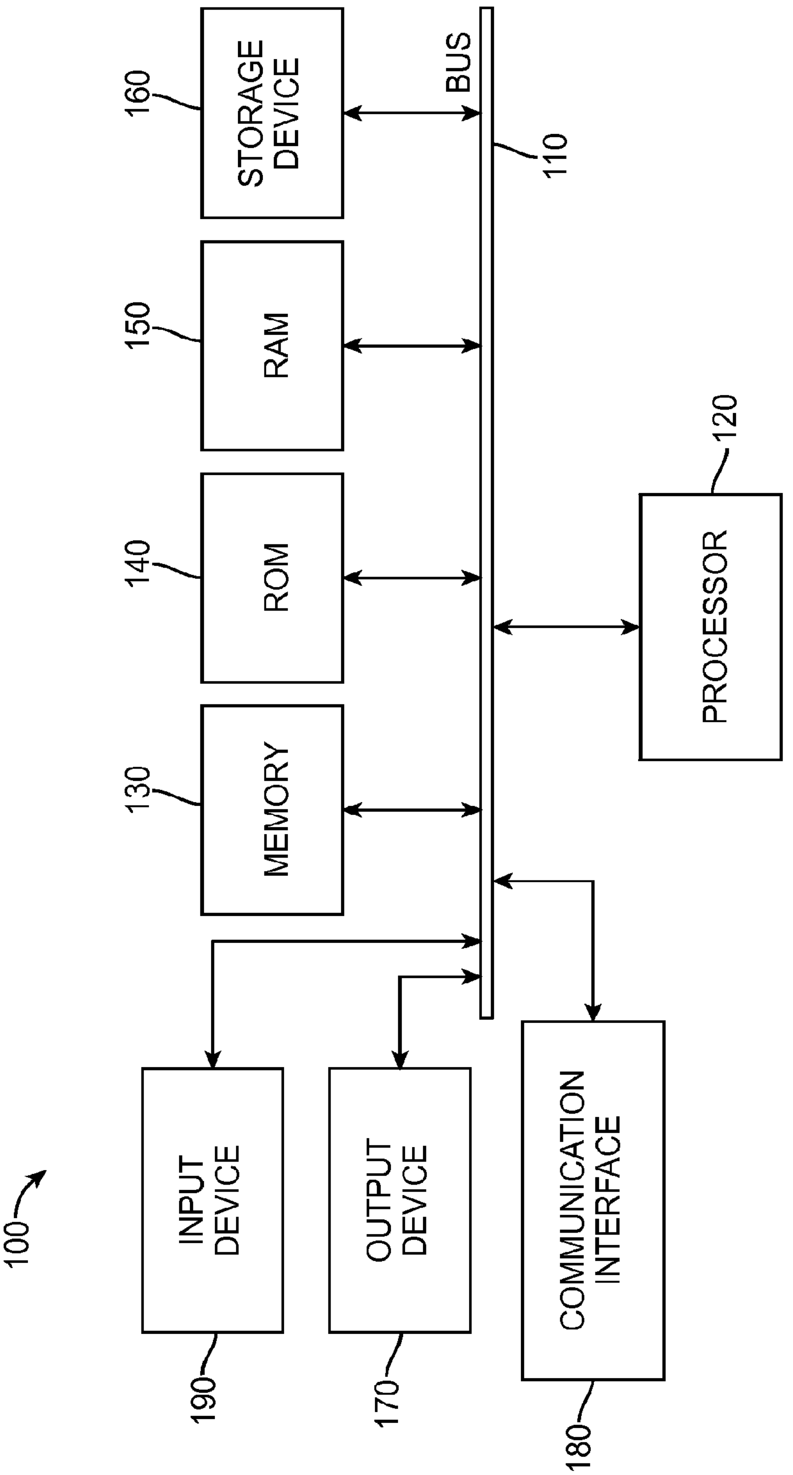
FIG. 1 illustrates hardware components associated with a system embodiment.

FIG. 1 illustrates the basic hardware components associated with the system embodiment of the disclosed technology. As shown in FIG. 1, an exemplary system includes a general-purpose computing device 100, including a processor, or processing unit (CPU) 120 and a system bus 110 that couples various system components including the system memory such as read only memory (ROM) 140 and random access memory (RAM) 150 to the processing unit 120. Other system memory 130 may be available for use as well. It will be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer-readable media provide non-volatile storage of computer-readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer-readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms such as a touch-sensitive screen for gesture or graphical input, accelerometer, keyboard, mouse, motion input, speech and so forth. The device output 170 can also be one or more of a number of output mechanisms known to those of skill in the art, such as a display or speakers. In some instances, multimodal systems enable a user to provide multiple types of input to communicate with the computing device 100. The communications interface 180 generally governs and manages the user input and system output. There is no restriction on the disclosed technology operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including but not limited to hardware capable of executing software. For example the functions of one or more processors shown in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The technology can take the form of an entirely hardware-based embodiment, an entirely software-based embodiment, or an embodiment containing both hardware and software elements. In one embodiment, the disclosed technology can be implemented in software, which includes but may not be limited to firmware, resident software, microcode, etc. Furthermore, the disclosed technology can take the form of a computer program product accessible from a computer-usable or computer-readable medium providing program code for use by or in connection with a computer or any instruction execution system. For the purposes of this description, a computer-usable or computerreadable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers may not be included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk read only memory (CD-ROM), compact disk read/write (CD-R/w), and DVD. Both processors and program code for implementing each as aspects of the technology can be centralized and/or distributed as known to those skilled in the art.

MIDI (Musical Instrument Digital Interface) is an industry-standard protocol that enables electronic musical instruments, such as keyboard controllers, computers, and other electronic equipment, to communicate, control, and synchronize with each other. MIDI does not transmit an audio signal or media, but rather transmits "event messages" such as the pitch and intensity of musical notes to play, control signals for parameters such as volume, vibrato and panning, cues, and clock signals to set the tempo. As an electronic protocol, MIDI is notable for its widespread adoption throughout the industry.

Figure 2A:
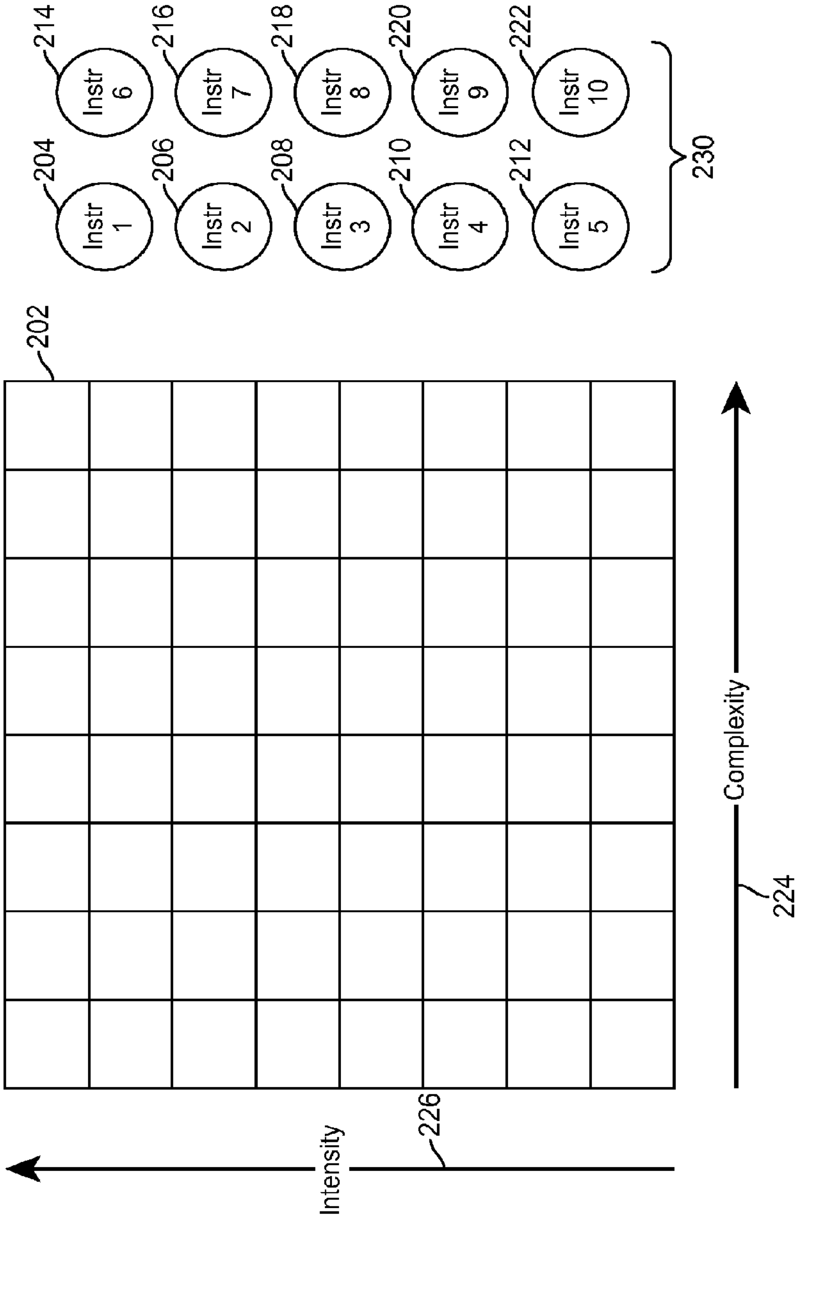
FIG. 2A illustrates a graphical user interface for programming a musical sequence in a first configuration.

FIG. 2A illustrates a graphical user interface for programming a musical sequence in a first configuration. A matrix 202 is shown. Matrix 202 includes 8×8 grid points. Other matrix sizes can also be used. In this embodiment, a single MIDI pattern is associated with each grid point, for a total of sixty-four MIDI patterns in this example. The MIDI patterns are organized by complexity from left to right along an x-axis 224 and in intensity from bottom to top along a y-axis 226. Complexity, in this example, can mean more notes per bar, for example, and intensity can mean volume of notes. In addition, the MIDI patterns are chosen so that they combine in a musical manner when played together.

In another embodiment, organization of MIDI patterns according to complexity could mean that number of notes will increase, plus the rhythmic relationship of the notes are more intricate and the pattern contains more ornaments like ghost notes.

In another embodiment, organization of MIDI patterns according to intensity could mean that MIDI notes in the MIDI patterns have a higher velocity. In addition, in this embodiment, drum kit pieces played by the MIDI notes may switch to more intense sounding kit pieces, like moving from a closed hi-hat to a half-open or even playing the hi-hat pattern on a different sound generator such as a ride or crash. Changing instruments, this example can make a dramatic impact on the perceived intensity of a pattern.

As another example, MIDI patterns of a complete rhythm section consisting of drums, bass, rhythm guitar, percussion and so on can be organized according to "density" and "tightness". Under the hood, MIDI patterns organized according to a "tightness" axis may change the "feel" of the pattern in numerous aspects going from a "loose, jamming type of feel" to a something that is perceived as "tight, in-the-pocket" playing by all instruments. This "tightness" can correspond to how closely MIDI notes in a MIDI pattern are to a particular grid. MIDI patterns organized according to a "density" axis can control how many instruments of the rhythm section play together the same chords or how "busy" the notes are. Busy can be defined as more notes in a given time frame.

A group of icons 230 are displayed. The icons 230 represent each instrument available for placing on the matrix 202. In one aspect, the group of icons 230 represent each piece of a drum kit software instrument. Each icon has a pre-defined output sound. The icons include Instr 1, 204, Instr 2, 206, Instr 3, 208, Instr 4, 210, Instr 5, 212, Instr 6, 214, Instr 7, 216, Instr 8, 218, Instr 9, 220, and Instr 10, 222.

In an example for drum programming, Icon 204 represents a kick drum sound, Icon 206 represents a snare sound, Icon 208 represents a rim shot sound, Icon 210 represents a clap sound, Icon 212 represents a shaker sound, Icon 214 represents a hi-hat sound, Icon 216 represents a conga sound, Icon 218 represents a second kick drum sound, Icon 220 represents a cymbal sound, and Icon 222 represents a cow bell sound.

When the icons 230 are not on the matrix 202, the predefined sounds corresponding to each icon are muted. A user can drag an icon to a selection grid point on matrix 202. This un-mutes the pre-defined sounds for that icon and causes the predefined sounds, such as a hi-hat, to play the pattern located on that grid point. The pattern for the icon's sound will now loop. The characteristics of the pre-defined sounds playing the pattern will have a complexity and intensity corresponding with the selected grid point's location on matrix 202. The user can continue dragging icons on matrix 202. Each time an icon is moved onto the matrix 202, and the predefined sounds corresponding to the icon are un-muted, the rhythms of the patterns played by the predefined sounds are mixed with any already looping instruments thus building and layering sound outputs from more and more icons. Likewise removing an icon off the grid will mute its respective pre-defined output sounds again. In this example, each icon can only be placed once on the matrix 202. In this example, at any point in the process the user may drag an already placed icon to a different grid position. If a user drags an already placed icon to a different grid position the pre-defined output sound will stop playing the pattern located on the first grid point and start playing the pattern located on the second grid point.

In this example, as moving grid position means a change in rhythm complexity and/or intensity, one advantage of this programming facility is an intuitive and easy to visualize way for novices to program drum patterns. Additionally, users can program musical sequences other than drum patterns using the disclosed technology.

Figure 2B:
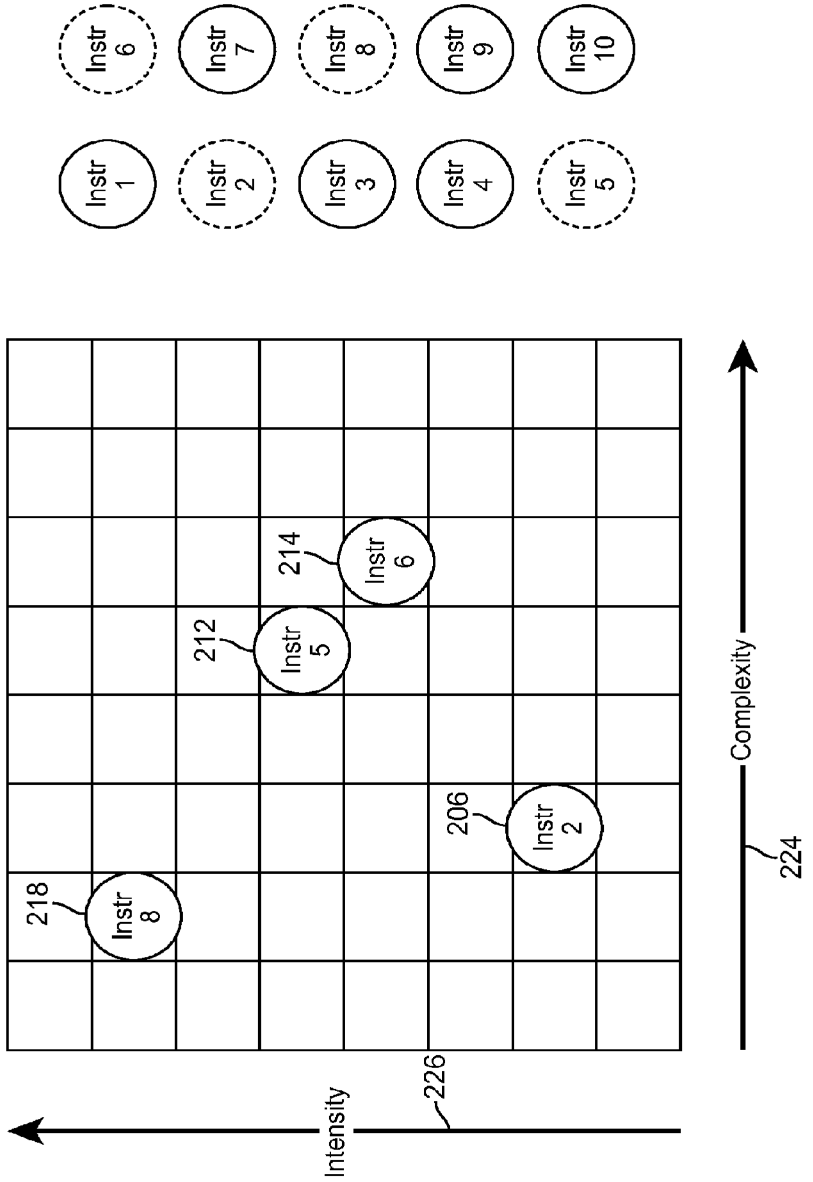
FIG. 2B illustrates the graphical user interface for programming a musical sequence in a second configuration.

FIG. 2B illustrates the graphical user interface for programming a musical sequence in a second configuration. In the example shown in FIG. 2B, a user has dragged icon 218 to position (2,7) on matrix 202. This causes the pre-defined second kick drum sound associated with icon 218 to play the pattern associated with position (2,7). This pattern has a complexity related to its position along x-axis 224 and an intensity related to its position along y-axis 226. In one example, a predefined sound corresponds to a note of a software instrument.

In the example shown in FIG. 2B, the user has also dragged icon 206 to position (3,2) on matrix 202. This causes the pre-defined snare sound associated with icon 206 to play the pattern associated with position (3,2). The user has also dragged icon 212 to position (5,5) on matrix 202. This causes the pre-defined shaker sound associated with icon 212 to play the pattern associated with position (5,5). The user has also dragged icon 214 to position (6,4) on matrix 202. This causes the pre-defined hi-hat sound associated with icon 214 to play the pattern associated with position (6,4).

The pre-defined second kick drum sound associated with icon 218 playing the pattern associated with position (2,7), the pre-defined snare sound associated with icon 206 playing the pattern associated with position (3,2), the pre-defined shaker sound associated with icon 212 playing the pattern associated with position (5,5), and the predefined hi-hat sound associated with icon 214 playing the pattern associated with position (6,4) combine to form a musical drum pattern with four elements. Thus, a user can create a drum pattern or other music sequence by dragging icons within matrix 202 where all elements of the sequence fit together musically.

Figure 2C:
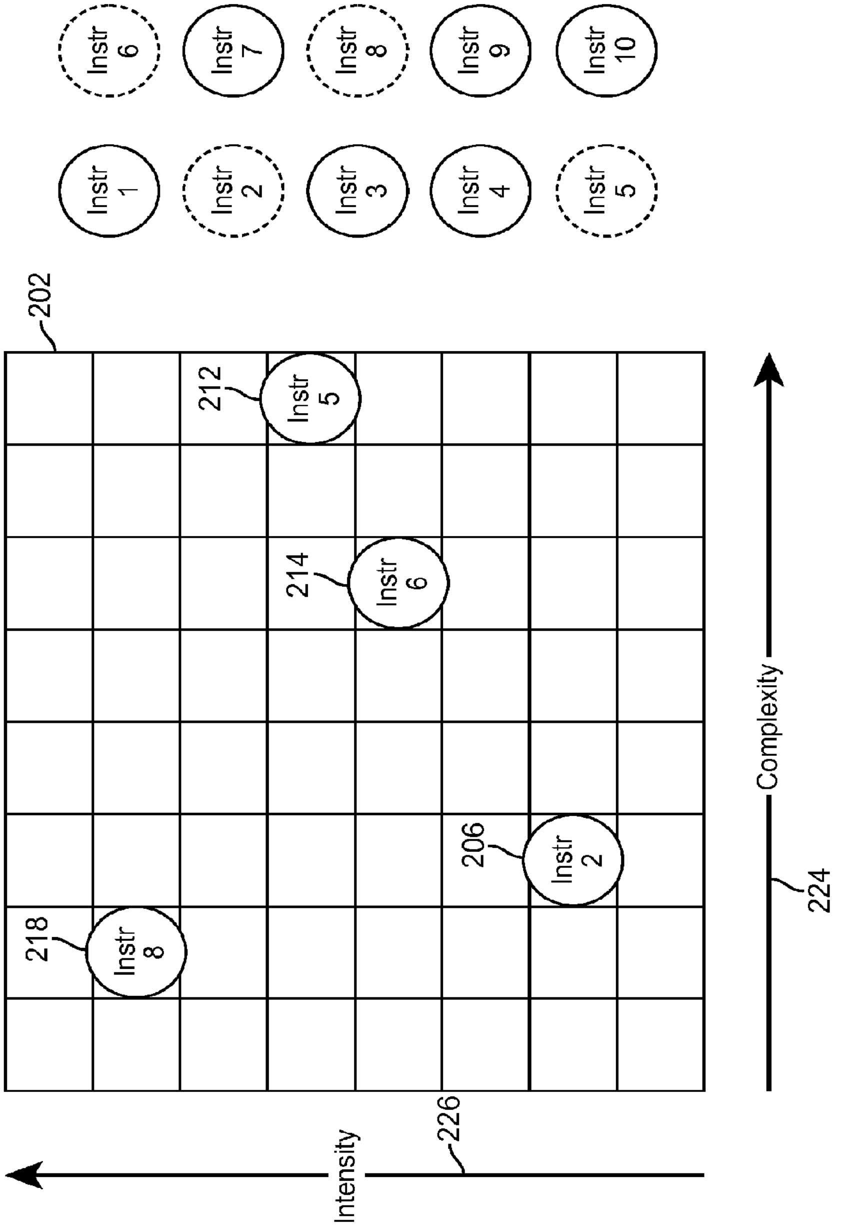
FIG. 2C illustrates the graphical user interface for programming a musical sequence in a third configuration.

FIG. 2C illustrates the graphical user interface for programming a musical sequence in a third configuration. In the example shown in FIG. 2C, the user has dragged icon 212 from position (5,5) to position (8,5) on matrix 202. This causes the pre-defined shaker sound associated with icon 212 to stop playing the pattern associated with position (5,5) and start playing the pattern associated with position (8,5,). This pattern has a complexity related to its position along x-axis 224 and an intensity related to its position along y-axis 226. More specifically, the pattern at position (8,5) has a higher complexity, but equal intensity because of its position on matrix 202.

The pre-defined second kick drum sound associated with icon 218 playing the pattern associated with position (2,7), the pre-defined snare sound associated with icon 206 playing the pattern associated with position (3,2), the pre-defined shaker sound associated with icon 212 playing the pattern associated with position (8,5), and the predefined hi-hat sound associated with icon 214 playing the pattern associated with position (6,4) combine to form a new modified musical drum pattern with the four elements. All elements of the new modified musical drum pattern also fit together musically.

Figure 2D:
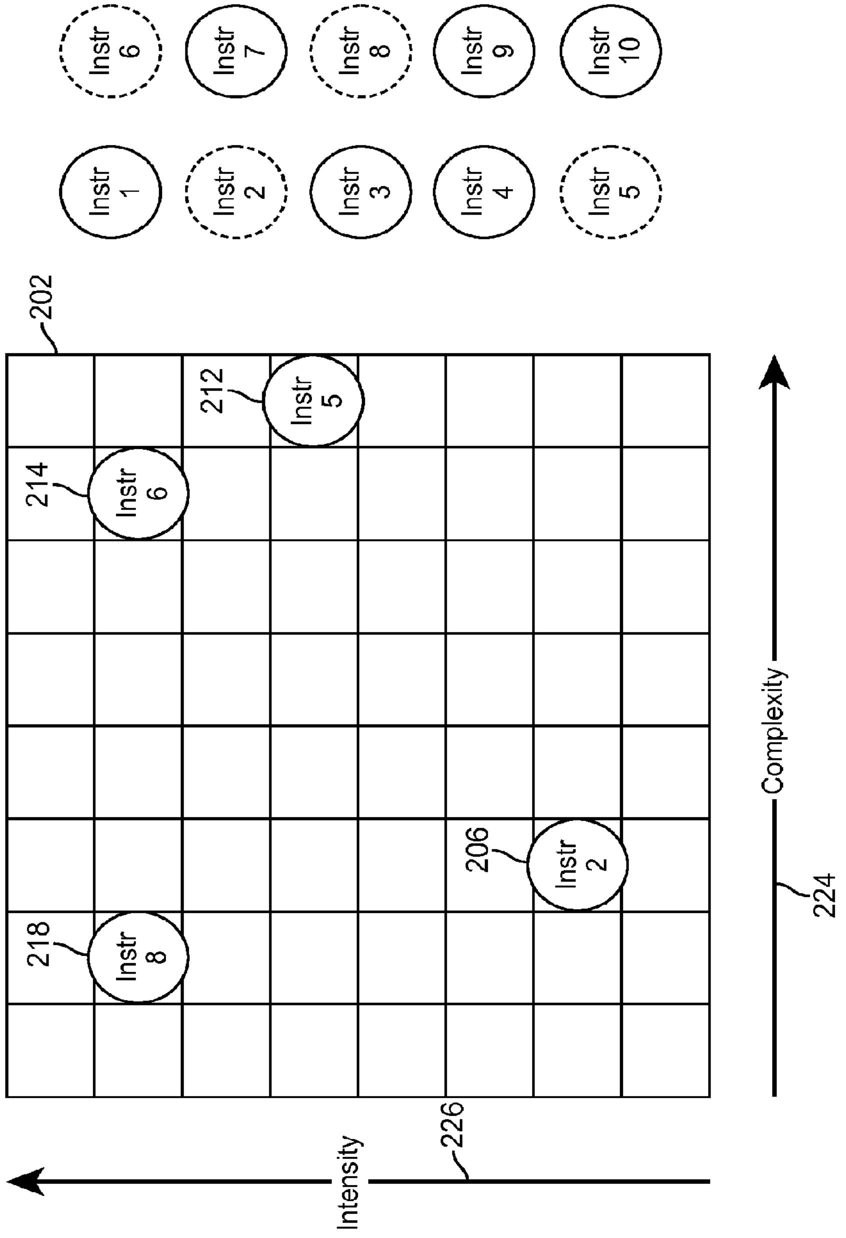
FIG. 2D illustrates the graphical user interface for programming a musical sequence in a fourth configuration.

FIG. 2D illustrates the graphical user interface for programming a musical sequence in a fourth configuration. In the example shown in FIG. 2D, the user has dragged icon 214 from position (6,4) to position (7,7) on matrix 202. This causes the pre-defined hi-hat sound associated with icon 214 to stop playing the pattern associated with position (6,4) and start playing the pattern associated with position (7,7). This pattern has a complexity related to its position along x-axis 224 and an intensity related to its position along y-axis 226. More specifically, the pattern at position (7,7) has a higher complexity and higher intensity because of its position on matrix 202, relative to the pattern at position (6,4).

The pre-defined second kick drum sound associated with icon 218 playing the pattern associated with position (2,7), the pre-defined snare sound associated with icon 206 playing the pattern associated with position (3,2), the pre-defined shaker sound associated with icon 212 playing the pattern associated with position (8,5), and the predefined hi-hat sound associated with icon 214 playing the pattern associated with position (7,7) combine to form a new modified musical drum pattern with the four elements. All elements of the new modified musical drum pattern also fit together musically.

Although in FIGS. 2A-2D only one pattern is associated with each grid point on matrix 202, in another embodiment multiple patterns can be associated with each grid point on matrix 202. For example, if there are 10 instrument icons, a matrix grid point can have 10 MIDI patterns, each MIDI pattern associated with its own instrument icon. When a user drags an icon to a grid point in this example, the predefined sounds associated with this icon will play the pattern associated with it.

In another embodiment, instead of associating MIDI patterns with grid points on a matrix, audio loops or wave files are associated with each grid point. In this embodiment each audio loop has a set length. Furthermore, in this embodiment the set length of each audio loop is set to an equal length. In this embodiment, the audio loops are chosen so that they fit together musically. In this embodiment, all audio loops can be time-stretched to fit a defined tempo. A user can place an object icon at any matrix position, thereby causing the processor to process the predefined output sound associated with the object in accordance with an audio loop pattern associated with the matrix position at which the object icon is placed, and to output the processed sound to an output device.

Figure 3:
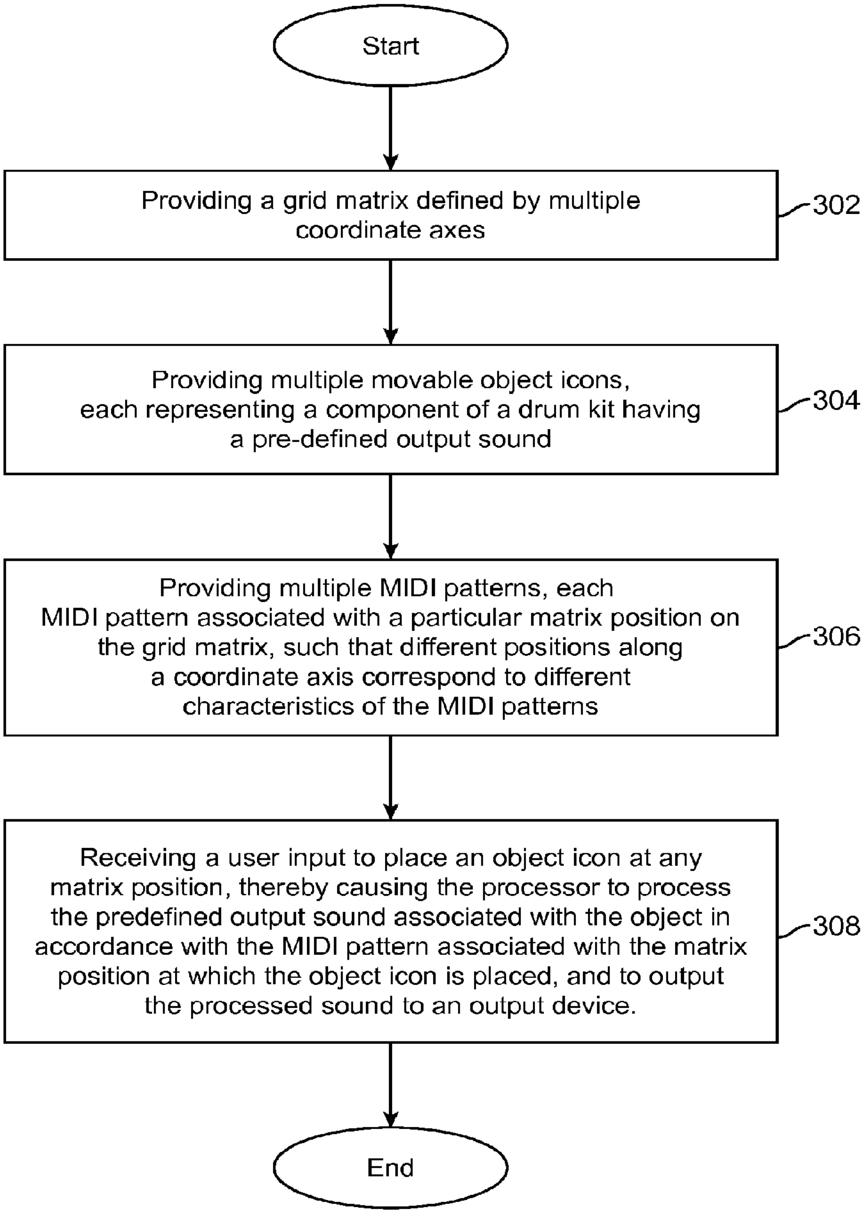
FIG. 3 is a flowchart for providing a graphical programming interface system to a user in which a single MIDI pattern is associated with a grid position on a matrix.

FIG. 3 is a flowchart for providing a graphical programming interface system to a user in which a single MIDI pattern is associated with a grid position on a matrix. At block 302 the method includes providing a grid matrix defined by multiple coordinate axes. Each selectable matrix position is identified by coordinate values. The grid matrix is displayed on a display device.

At block 304, the method includes providing multiple movable object icons, each representing a component of a drum kit having a pre-defined output sound.

At block 306, the method includes providing multiple MIDI patterns, each MIDI pattern associated with a particular matrix position on the grid matrix, such that different positions along a coordinate axis correspond to different characteristics of the MIDI patterns. The MIDI patterns are stored in a memory device.

At block 308, the method includes receiving a user input to place an object icon at any matrix position, thereby causing the processor to process the predefined output sound associated with the object in accordance with the MIDI pattern associated with the matrix position at which the object icon is placed, and to output the processed sound to an output device.

Another embodiment includes the method includes providing multiple audio loop patterns, each audio loop pattern associated with a particular matrix position on the grid matrix, such that different positions along a coordinate axis correspond to different characteristics of the audio loop patterns. The audio loop patterns are stored in a memory device. This embodiment includes receiving a user input to place an object icon at any matrix position, thereby causing the processor to process the predefined output sound associated with the object in accordance with the audio loop pattern associated with the matrix position at which the object icon is placed, and to output the processed sound to an output device.

In one example, a characteristic of the MIDI/audio loop patterns is a rhythmic pattern of the MIDI/audio loop patterns. In one embodiment, the rhythmic pattern increases in complexity along a direction of a first coordinate axis of the grid matrix.

In one example, a characteristic of the MIDI/audio loop patterns is intensity of the MIDI/audio loop patterns. In one embodiment, the intensity of the MIDI/audio loop patterns increases along a direction of a second coordinate axis of the grid matrix.

Figure 4:
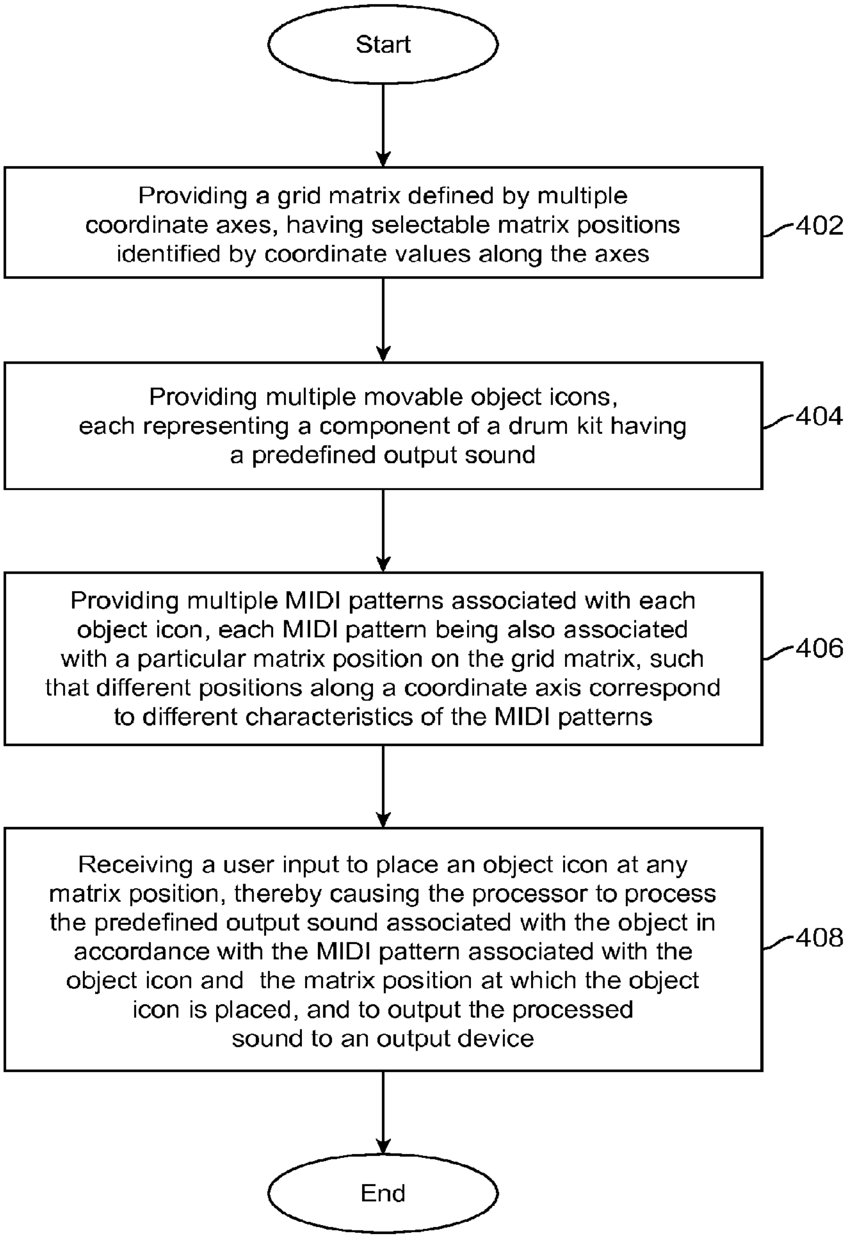
FIG. 4 is a flowchart for providing a graphical programming interface system to a user in which multiple MIDI patterns are associated with a grid position on a matrix.

FIG. 4 is a flowchart for providing a graphical programming interface system to a user in which multiple MIDI patterns are associated with a grid position on a matrix.

At block 402, the method includes providing a grid matrix defined by multiple coordinate axes, having selectable matrix positions identified by coordinate values along the axes. The grid matrix is displayed on a display device.

At block 404, the method includes providing multiple movable object icons, each representing a component of the drum kit having a predefined output sound.

At block 406, the method includes providing multiple MIDI patterns associated with each object icon, each MIDI pattern being also associated with a particular matrix position on the grid matrix, such that different positions along a coordinate axis correspond to different characteristics of the predefined sound for each object represented by the object icons. The MIDI patterns are stored in a memory device.

At block 408, the method includes receiving a user input to place an object icon at any matrix position, thereby causing the processor to process the predefined output sound associated with the object in accordance with the MIDI pattern associated with the matrix position at which the object icon is placed, and to output the processed sound to an output device.

Another embodiment includes providing multiple audio loop patterns associated with each object icon, each audio loop pattern being also associated with a particular matrix position on the grid matrix, such that different positions along a coordinate axis correspond to different characteristics of the predefined sound for each object represented by the object icons. The audio loop patterns are stored in a memory device. This embodiment includes receiving a user input to place an object icon at any matrix position, thereby causing the processor to process the predefined output sound associated with the object in accordance with the audio loop pattern associated with the matrix position at which the object icon is placed, and to output the processed sound to an output device.

One embodiment for a graphical programming interface system includes a processor. The system further includes a grid matrix defined by multiple coordinate axes, having selectable matrix positions identified by coordinate values along the axes. In this embodiment, the grid matrix is displayed on a display device.

The system embodiment further includes multiple movable object icons, each representing an object having a predefined output sound.

The system embodiment further includes multiple object data files associated with each object icon, each object data file being also associated with a particular matrix position on the grid matrix, such that different positions along a coordinate axis correspond to different characteristics of the predefined sound for each object represented by the object icons. The multiple object data files are stored in a memory device.

Further in this system embodiment, placement of an object icon at any matrix position causes the processor to process the predefined output sound associated with the object in accordance with the object data file associated with the matrix position at which the object icon is placed, and output the processed sound to an output device.

In a further example, the object data files are MIDI patterns. In another example, the object data files are audio loop patterns. In another example, each object icon represents a component of a drum kit. In another example, a characteristic of the predefined sound for each object data file is a rhythmic pattern of the drum kit component. In this example, the rhythmic pattern can increase in complexity along a direction of a first coordinate axis of the grid matrix. In another example, a characteristic of the predefined sound for each object data file is intensity or volume of the predefined sound of the drum kit component.

In another example, the intensity of the predefined sound increases along a direction of a second coordinate axis of the grid matrix. In another example, the plurality of object data files are soundwave files. In another example, the object icons are movable on the display device by a user using a device such as a keyboard, mouse, or touch-sensitive mechanism on the display device. In another example, the grid matrix is a two-dimensional matrix.

Embodiments within the scope of the present disclosure may also include tangible and/or non-transitory computer-readable storage media for carrying or having computer executable instructions or data structures stored thereon. Such non-transitory computer readable storage media can be any available media that can be accessed by a general purpose or special purpose computer, including the functional design of any special purpose processor as discussed above. By way of example, and not limitation, such nontransitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network pes, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The above disclosure provides examples within the scope of claims, appended hereto or later added in accordance with applicable law. However, these examples are not limiting as to how any disclosed embodiments may be implemented, as those of ordinary skill can apply these disclosures to particular situations in a variety of ways.

The invention claimed is:

1. A system, comprising:

a memory device storing a plurality of data files, each data file storing a rhythmic pattern; and a processor configured to display, in a user interface, a matrix having matrix positions, display, in the user interface, a plurality of movable object icons each representing a musical instrument, and in response to placement of an object icon at a matrix position, process sound data according to the rhythmic pattern stored in one of the data files, the data file being associated with the matrix position at which the object icon is placed, and output the processed sound data to an output device.

2. The system of claim 1, wherein the plurality of data files comprise MIDI patterns.

3. The system of claim 1, wherein at least one of the object icons represents a component of a drum kit.

4. The system of claim 1, wherein each object icon is associated with a predefined sound.

5. The system of claim 1, wherein the rhythmic pattern increases in complexity along a direction of a coordinate axis of the matrix.

6. The system of claim 1, wherein each data file comprises an intensity characteristic.

7. The system of claim 1, wherein the intensity characteristic of the data files increases along a direction of a coordinate axis of the matrix.

8. The system of claim 1, wherein at least some of the data files comprise predefined sound files.

9. The system of claim 1, wherein the object icons are movable by a user using at least one of a keyboard, mouse, or touch-sensitive mechanism.

10. The system of claim 1, wherein the matrix is a two-dimensional matrix.

11. The method of claim 1, wherein the musical instrument comprises a drum kit.

12. The method of claim 1, wherein the rhythmic pattern increases in complexity along a direction of a coordinate axis of the matrix.

13. The method of claim 1, wherein a characteristic of each MIDI pattern is intensity of the MIDI pattern.

14. The method of claim 4, wherein the intensity of each MIDI pattern increases along a direction of a coordinate axis of the matrix.

15. The computer program product of claim 6, wherein the musical instrument comprises a drum kit.

16. The computer program product of claim 6, wherein the rhythmic pattern increases in complexity along a direction of a coordinate axis of the matrix.

17. The computer program product of claim 6, wherein a characteristic of each MIDI pattern is intensity of the MIDI pattern.

18. The computer program product of claim 9, wherein the intensity of each MIDI pattern increases along a direction of a coordinate axis of the matrix.

19. A method implemented on a computer system, comprising:

displaying, in a user interface, a matrix having matrix positions;

displaying, in the user interface, a plurality of movable object icons, each representing a component of a musical instrument;

receiving data representing a plurality of rhythmic MIDI patterns associated with each object icon, each rhythmic MIDI pattern also being associated with a particular matrix position on the matrix; and in response to receiving a user input to place an object icon at a matrix position, causing a processor to process sound data according to the rhythmic MIDI pattern associated with the matrix position at which the object icon is placed, and output the processed sound data to an output device.

20. A computer program product comprising a plurality of computer executable instructions stored on a computer readable storage device, the instructions causing a computer to:

display, in a user interface, a matrix having matrix positions;

display, in the user interface, a plurality of movable object icons, each representing a component of a musical instrument;

receive data representing a plurality of rhythmic MIDI patterns associated with each object icon, each rhythmic MIDI pattern also being associated with a particular matrix position on the matrix; and in response to receiving a user input to place an object icon at a matrix position, process sound data according to the rhythmic MIDI pattern associated with the matrix position at which the object icon is placed, and output the processed sound data to an output device.

21. A computer program product comprising a plurality of computer executable instructions stored on a computer readable storage device, the instructions causing a computer to:

display, in a user interface, a two-dimensional matrix, the matrix comprising an x-axis and a y-axis;

display, in the user interface, a plurality of object icons each representing a musical instrument;

receive, in the user interface, a placement of one of the object icons at a position on the matrix, the position on the matrix comprising a position on each of the x-axis and the y-axis;

determine a rhythmic pattern associated with the object icon, the rhythmic pattern having a characteristic based on the position of the object icon on at least one of the x-axis and the y-axis; and cause sound to be played based on the determined rhythmic pattern.

22. The computer program product of claim 21, wherein at least one of the object icons represents a drum kit.

23. The computer program product of claim 21, wherein the rhythmic pattern comprises a MIDI pattern.

24. The computer program product of claim 21, wherein the characteristic comprises a complexity characteristic.

25. The computer program product of claim 21, wherein the characteristic comprises an intensity characteristic.

26. The computer program product of claim 21, wherein the characteristic of the rhythmic pattern changes along a direction of at least one of the x-axis and the y-axis of the matrix.

27. The computer program product of claim 21, wherein the object icons are movable by a user using a touch-sensitive mechanism.

28. A method implemented on a computer system, comprising:

displaying, in a user interface, a two-dimensional matrix, the matrix comprising an x-axis and a y-axis;

displaying, in the user interface, a plurality of object icons each representing a musical instrument;

receiving, in the user interface, a placement of one of the object icons at a position on the matrix, the position on the matrix comprising a position on each of the x-axis and the y-axis;

determining a rhythmic pattern associated with the object icon, the rhythmic pattern having a characteristic based on the position of the object icon on at least one of the x-axis and the y-axis; and causing sound to be played based on the determined rhythmic pattern.

29. The method of claim 28, wherein at least one of the object icons represents a drum kit.

30. The method of claim 28, wherein the rhythmic pattern comprises a MIDI pattern.

31. The method of claim 28, wherein the characteristic comprises a complexity characteristic.

32. The method of claim 28, wherein the characteristic comprises an intensity characteristic.

33. The method of claim 28, wherein the characteristic of the rhythmic pattern changes along a direction of at least one of the x-axis and the y-axis of the matrix.

34. The method of claim 28, wherein the object icons are movable by a user using a touch-sensitive mechanism.

* * * * *